United States Patent
Ki et al.

(10) Patent No.: US 9,324,251 B2
(45) Date of Patent: Apr. 26, 2016

(54) STEREOSCOPIC DISPLAY DEVICE AND MOBILE DEVICE HAVING THE SAME

(71) Applicant: LG ELECTRONICS INC., Seoul (KR)

(72) Inventors: Jeongseok Ki, Bucheon (KR); Misook Kim, Seoul (KR); Seungmin Seen, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 384 days.

(21) Appl. No.: 13/669,743

(22) Filed: Nov. 6, 2012

(65) Prior Publication Data

US 2013/0127839 A1    May 23, 2013

(30) Foreign Application Priority Data

Nov. 17, 2011    (KR) .......................... 10-2011-0120346

(51) Int. Cl.
| | |
|---|---|
| *G09G 3/36* | (2006.01) |
| *G06T 15/00* | (2011.01) |
| *G09G 3/00* | (2006.01) |
| *H04N 13/02* | (2006.01) |
| *H04N 13/04* | (2006.01) |

(52) U.S. Cl.
CPC ........... *G09G 3/003* (2013.01); *H04N 13/0207* (2013.01); *H04N 13/0402* (2013.01); *G09G 3/36* (2013.01)

(58) Field of Classification Search
CPC .......... H04N 13/0207; H04N 13/0402; H04N 13/0468; H04N 2013/0465; H04N 13/0452; H04N 13/0454; G09G 3/36; G09G 3/003; G09G 2320/068; G02F 1/1323; G02F 1/133526; G06F 3/0488; G02B 26/0875

USPC ................ 345/419, 87, 653; 349/15, 200
See application file for complete search history.

(56) References Cited

U.S. PATENT DOCUMENTS

| | | | |
|---|---|---|---|
| 5,493,427 A | | 2/1996 | Nomura et al. |
| 2005/0057812 A1 | | 3/2005 | Raber |
| 2008/0252720 A1 | * | 10/2008 | Kim et al. ........................ 348/59 |
| 2009/0033812 A1 | * | 2/2009 | Ijzerman et al. ................ 349/15 |
| 2011/0096250 A1 | * | 4/2011 | Cha et al. ........................ 349/15 |
| 2012/0044330 A1 | * | 2/2012 | Watanabe ........................ 348/54 |
| 2012/0139897 A1 | * | 6/2012 | Butler et al. ................... 345/419 |
| 2013/0027772 A1 | * | 1/2013 | Large ............................. 359/464 |

FOREIGN PATENT DOCUMENTS

| | | |
|---|---|---|
| CN | 101228472 A | 7/2008 |
| CN | 102043302 A | 5/2011 |
| CN | 102158724 A | 8/2011 |
| CN | 102231032 A | 11/2011 |
| EP | 1750459 A2 | 2/2007 |
| EP | 1906226 A1 | 4/2008 |
| EP | 2322987 A1 | 5/2011 |
| JP | 2003-215478 A | 7/2003 |
| WO | WO 2011/088615 A1 | 7/2011 |

* cited by examiner

*Primary Examiner* — Vijay Shankar
*Assistant Examiner* — Abhishek Sarma
(74) *Attorney, Agent, or Firm* — Birch, Stewart, Kolasch & Birch, LLP

(57) ABSTRACT

A mobile terminal comprising a stereoscopic display unit outputting a stereoscopic image is disclosed. In one embodiment the stereoscopic display unit comprises a display element configured to periodically display left and right images, a refractive lens unit disposed to overlap with the display element and configured to change refractive characteristics thereof, and a controller configured to control the refractive characteristics of the refractive lens unit such that a refraction direction of transmitted light is periodically changed to make the left and right images face in different directions.

18 Claims, 12 Drawing Sheets

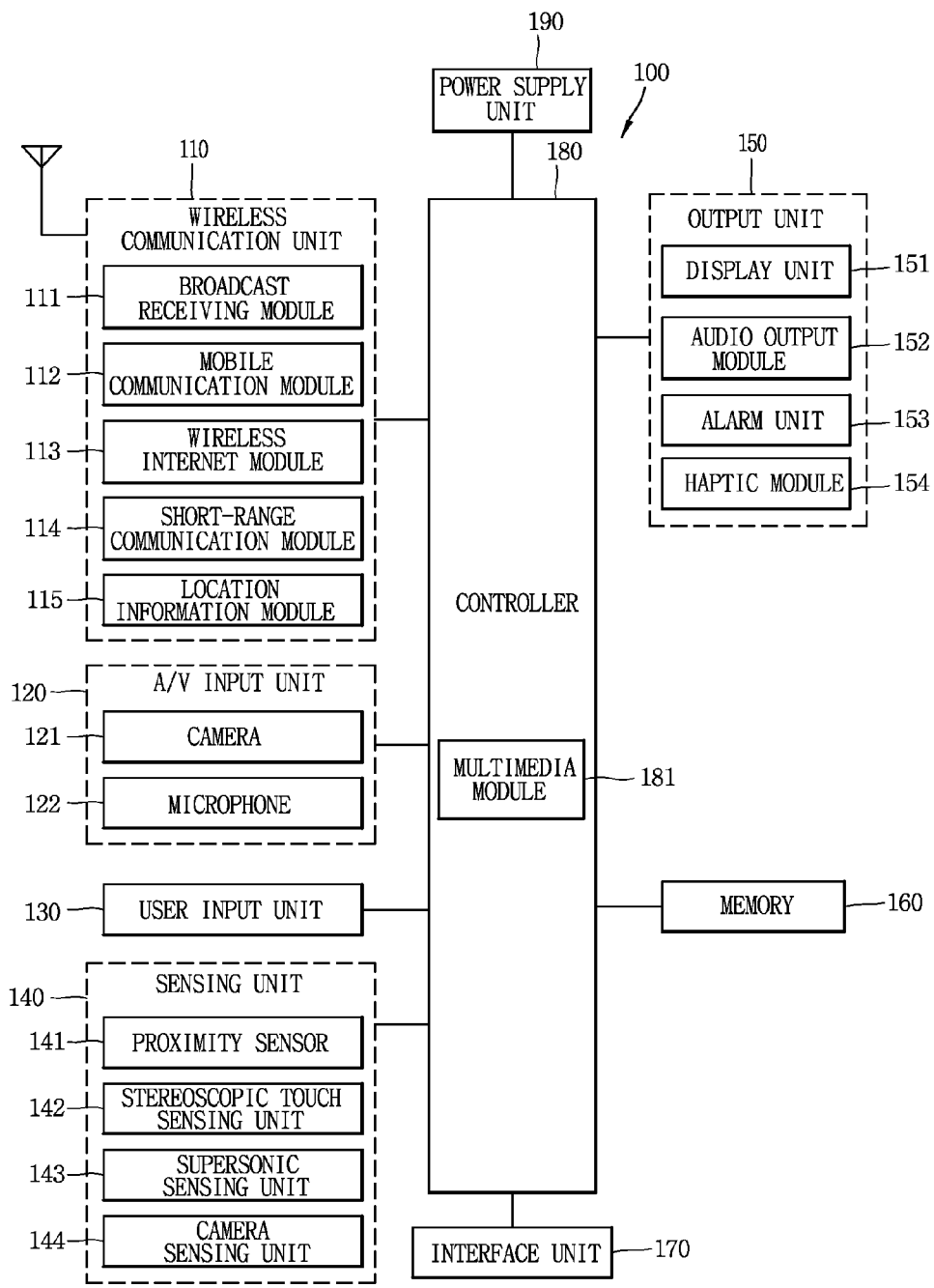

STEREOSCOPIC DISPLAY DEVICE AND MOBILE DEVICE HAVING THE SAME

CROSS REFERENCE TO RELATED APPLICATIONS

The present application claims priority to Korean Application No. 10-2011-0120346 filed in Korea on Nov. 17, 2011, the entire contents of which is hereby incorporated by reference in its entirety.

BACKGROUND OF THE DISCLOSURE

1. Field of the Disclosure

Embodiments of the disclosure generally relate to the field of electronics, and more particularly to control methods and systems of mobile devices.

2. Description of the Related Art

A terminal may be divided into a mobile terminal and stationary terminal. The mobile terminal may be divided into a handheld terminal and a vehicle mount terminal. The mobile terminal now can support more complicated functions such as capturing images or video, reproducing music or video files, playing games, receiving broadcast signals, and the like. By comprehensively and collectively implementing such functions, the mobile terminal may be embodied in the form of a multimedia player or device. Efforts are ongoing to support and increase the functionality of mobile terminals. Such efforts include software and hardware improvements, as well as changes and improvements in the structural components which form the mobile terminal.

The mobile terminal has been evolving to provide more functions to the users and enhance portability. Fore example, a touch screen for the mobile terminal has come to prominence. Also, as the consumers' interest in 3D images is increasing, more and more movie contents or TV contents are being produced in stereoscopic images. The mobile terminal is also designed to provide the functions associated with the stereoscopic images lately.

SUMMARY OF THE DISCLOSURE

An aspect of the present disclosure provides a mobile terminal having enhanced optical performance with respect to a stereoscopic image.

Another aspect of the present disclosure provides a mobile terminal capable of displaying a customized stereoscopic image through a novel mechanism.

According to an aspect of the present disclosure, there is provided a mobile terminal including a stereoscopic display unit outputting a stereoscopic image, wherein the stereoscopic display unit includes a display element configured to periodically display left and right images; a refractive lens unit disposed to overlap with the display element and formed such that refractive characteristics thereof are changeable; and a controller configured to control the refractive characteristics of the refractive lens unit such that a refraction direction of transmitted light is periodically changed to make the left and right images face in different directions.

According to an example in relation to the present disclosure, the refractive lens unit may be formed such that liquid crystal accommodated therein is varied according to a change in a voltage distribution. The refractive lens unit includes an upper substrate, an upper electrode, a lower substrate, and a lower electrode. The upper substrate may be configured to be light-transmissive, the upper electrode may be formed on the upper substrate, and the lower substrate may be spaced apart from the upper substrate to form space in which liquid crystal is accommodated, and may be configured to be light-transmissive. The lower electrode may be disposed on the lower substrate, and form a voltage which is periodically changed with the upper electrode so that the state of the liquid crystal can be periodically varied.

The upper electrode and the lower electrode may include unit electrodes which are repeatedly disposed, and the controller may periodically control power supply to the unit electrodes. Any one of unit electrodes of the upper electrode and the lower electrode may have a size different from that of another unit electrode.

The refractive lens unit may include first and second unit electrodes, each having a different length, arranged on the substrate formed to be light-transmissive and third and fourth unit electrodes disposed to be symmetrical to the first and second unit electrodes on the substrate.

The plurality of electrodes may be divided into first and second groups, and the first and second groups may be controlled to form the voltage which is periodically changed.

According to another example in relation to the present disclosure, the display element may be configured to periodically display a left image and a right image, and the refractive lens unit may be a liquid crystal panel having liquid crystal accommodated therein, and here, a state of the liquid crystal is periodically changed to be matched to a display period of the left image and the right image.

The controller may be formed to control refractive characteristics of the liquid crystal panel by using the change in the state of the liquid crystal such that the left image and the right image face the user's left eye and right eye, respectively.

According to another example in relation to the present disclosure, the refractive lens unit is configured to tilt, and an angle between the refractive lens unit and the display element is periodically controlled according to the tilting. The refractive lens unit may include an incident surface and an output surface, and the incident surface and the output surface may be sloped with respect to the display element by the tilting.

According to another example in relation to the present disclosure, the terminal may include a sensing unit mounted on the main body of the terminal and sensing a reference part of the user and a relative position of the stereoscopic display unit. The controller may control refractive characteristics of the refractive lens unit by using the relative position. The sensing unit may sense a degree at which the reference part of the user is deflected to the left or right based on the main body, and the refractive characteristics may be controlled to adjust the deflection degree.

According to another example in relation to the present disclosure, the stereoscopic display unit may be configured to sense a touch input, and directions in which the left and right images face may be changed according to the touch input. The controller may control the refractive characteristics of the refractive member such that the directions in which the left image and the right image face are adjusted by using a direction of a drag input with respect to the stereoscopic display unit.

According to another example in relation to the present disclosure, the stereoscopic display unit may be configured to selectively display a 2D image and the stereoscopic image, and the controller may control the refractive characteristics of the refractive lens unit to adjust a viewing angle of the 2D image.

The stereoscopic display unit may be disposed on a front surface of the main body, and the controller may control the refractive characteristics of the refractive lens unit such that the 2D image is collected to be output in a direction perpendicular to the front surface of the terminal main body, rather than being output to spread to lateral sides, as well as to the frontal side, based on the surface of the main body.

The terminal may include a sensing unit mounted on the main body of the terminal and sensing a user's location, and the controller may control refractive characteristics of the refractive lens unit such that the direction in which the 2D image is output is changed according to a location movement of the user.

According to another aspect of the present disclosure, there is provided a mobile terminal including: a main body; and a stereoscopic display unit provided on the main body and outputting a stereoscopic image, wherein the stereoscopic display unit includes: a display element configured to periodically display left and right images; a refractive lens unit disposed to overlap with the display element and periodically changing a refraction direction of transmitted light; and a controller configured to match a change period of the refraction direction of transmitted light to a display period of the left and right images such that the left and right images face in mutually different directions. The refractive lens unit may be a liquid crystal panel accommodating liquid crystal therein, and a voltage distribution of the liquid crystal panel may be changed to allow the liquid crystal accommodated in the liquid crystal panel have a plurality of characteristics.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given hereinbelow and the accompanying drawings, which are given by illustration only, and thus are not limitative of the present disclosure, and wherein:

FIG. 1 is a schematic block diagram shown an embodiment of a mobile terminal related to the present disclosure.

DETAILED DESCRIPTION OF THE DISCLOSURE

Figure 2A:
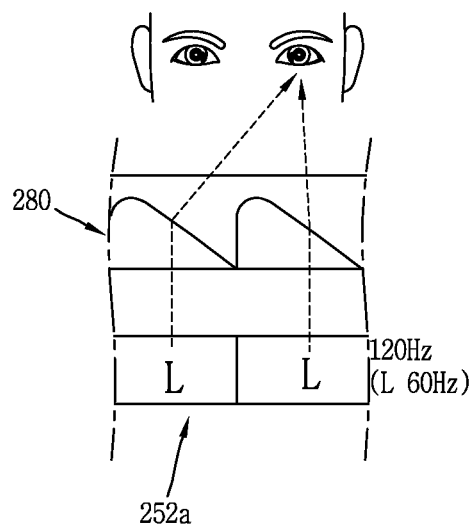
FIGS. 2A and 2B are conceptual views showing an example of an operation of the mobile terminal related to the present disclosure.

The mobile terminal according to exemplary embodiments of the present disclosure will now be described with reference to the accompanying drawings. In the following description, usage of suffixes such as 'module', 'part' or 'unit' used for referring to elements is given merely to facilitate explanation of the present disclosure, without having any significant meaning by itself. Accordingly, the 'module' and 'part' may be mixedly used. In describing the present disclosure, if a detailed explanation for a related known function or construction is considered to unnecessarily divert the gist of the present disclosure, such explanation has been omitted but would be understood by those skilled in the art. It will be appreciated that the accompanying drawings are presented to help understand the present disclosure more clearly and the technical concept of the present disclosure is not limited by the accompanying drawings.

Mobile terminals described in the present disclosure may include mobile phones, smart phones, notebook computers, tablet computers, digital broadcast receivers, PDAs (Personal Digital Assistants), PMPs (Portable Multimedia Player), navigation devices, and the like. However, it would be understood by a person skilled in the art that the configuration according to embodiments of the present disclosure can be also applicable to the fixed types of terminals such as digital TVs, desk top computers, and the like, except for any elements especially configured for a mobile purpose.

FIG. 1 is a block diagram of a mobile terminal according to an embodiment of the present disclosure. The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows. The wireless communication unit 110 typically includes one or more modules allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal. The broadcast associated information may also be provided via a mobile communication network and, in this case, the broadcast associated information may be received by the mobile communication module 112. Broadcast signals and/or broadcast-associated information received via the broadcast receiving module 111 may be stored in the memory 160.

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception. The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like. The location information module 115 is a module for checking or acquiring a location (or position) of the mobile terminal. A typical example of the location information module is a GPS (Global Positioning System).

With reference to FIG. 1, the A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on a display unit 151. The image frames processed by the camera 121 may be stored in the memory 160 or transmitted via the wireless communication unit 110. Two or more cameras 121 may be provided according to the configuration of the mobile terminal.

The microphone 122 may receive sounds via a microphone in a phone call mode, a recording mode, a voice recognition mode, and the like, and process such sounds into audio data. The processed audio data may be converted for output into a format transmittable to a mobile communication base station via the mobile communication module 112 in case of the phone call mode. The microphone 122 may implement various types of noise canceling algorithms to cancel noise or interference generated in the course of receiving and transmitting audio signals. The user input unit 130 may generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted), a jog wheel, a jog switch, and the like.

The sensing unit 140 detects a current status of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the display unit 151, an audio output module 152, an alarm unit 153, a haptic module 154, and the like. The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display. Some of them may be configured to be transparent to allow viewing of the exterior, which may be called transparent displays. A typical transparent display may be, for example, a TOLED (Transparent Organic Light Emitting Diode) display, or the like. The rear structure of the display unit 151 may include the light-transmissive structure. With such a structure, the user can view an object located at a rear side of the terminal body through the region occupied by the display unit 151 of the terminal body.

The mobile terminal 100 may include two or more display units according to its embodiment. For example, a plurality of display units may be separately or integrally disposed on one surface or disposed on both surfaces of the mobile terminal, respectively. Meanwhile, when the display unit 151 and a sensor (referred to as a 'touch sensor', hereinafter) are overlaid in a layered manner (referred to as a 'touch screen', hereinafter), the display unit 151 may be used as both an input device and an output device. The touch sensor may have the form of, for example, a touch film, a touch sheet, a touch pad, etc.

The touch sensor may be configured to convert a pressure applied to a particular portion of the display unit 151 or a change in capacitance generated at a particular portion of the display unit 151 into an electrical input signal. The touch sensor may be configured to detect the pressure when a touch is applied, as well as a touched position or area. When a touch with respect to the touch sensor is input, corresponding signal (signals) are transmitted to a touch controller. The touch controller processes the signal (signals) and transmits corresponding data to the controller 180. Thus, the controller 180 can recognize which portion of the display unit 151 has been touched.

With reference to FIG. 1, the proximity sensor 141 may be disposed in an internal area of the mobile terminal covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and it can be utilized for various purposes.

The example of the proximity sensor 141 may be a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like. When the touch screen is an electrostatic type touch screen, an approach of a sensing target is detected based on a change in an electric field according to the approach of the sensing target. In this case, the touch screen (touch sensor) may be classified as a proximity sensor.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer, and the like.

The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, to inform about an occurrence of an event. The video or audio signals may be also output via the audio output module 153, so the display unit 151 and the audio output module 153 may be classified as parts of the alarm unit 154.

The haptic module 155 generates various tactile effects the user may feel. A typical example of the tactile effects generated by the haptic module 155 is vibration. The strength and pattern of the haptic module 155 can be controlled. For example, different vibrations may be combined to be output or sequentially output. Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat. The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are input or output. In addition, the memory 160 may store data regarding various patterns of vibrations and audio signals output when a touch is input to the touch screen. The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like. The identification module may be a chip that stores various types of information for authenticating the authority to use the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port. When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be implemented apart from the controller 180. The controller 180 may perform a pattern recognition processing to recognize a handwriting input or a picture drawing input performed on the touch screen as characters or images, respectively. The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof. For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

A method for processing a user input with respect to the mobile terminal will now be described. The user input unit 130 is manipulated to receive a command for controlling the operation of the mobile terminal 100 and may include a plurality of manipulation units. The manipulation units may be generally referred to as a manipulating portion, and any methods and techniques may be employed for the manipulation portion so long as they can be operated by the user in a tactile manner.

Various types of visual information may be displayed on the display unit 151. The information may be displayed in the form of characters, numbers, symbols, graphics, icons, etc, or may be configured as a 3D stereoscopic image. In order to input such information, at least one of the characters, numbers, symbols, graphics, and icons are displayed in a certain array so as to be implemented in the form of a keypad. Such keypad may be so-called 'soft key'.

The display unit 151 may be operated as a whole region or may be divided into a plurality of regions and accordingly operated. In the latter case, the plurality of regions may be operated in association with each other. For example, an output window and an input window may be displayed on upper and lower portions of the display unit 151, respectively. The output window and the input window are regions allocated for outputting or inputting information, respectively. Soft keys including numbers for inputting a phone number, or the like, may be output to the input window. When a soft key is touched, a number, or the like, corresponding to the touched soft key is displayed on the output window. When the manipulation unit is manipulated, a call connection with respect to a phone number displayed on the output window may be attempted, or text displayed on the output window may be input to an application.

The display unit 151 or the touch pad may be configured to receive a touch through scrolling. The user may move a cursor or a pointer positioned on an entity, e.g., an icon, or the like, displayed on the display unit 151 by scrolling the display unit 151 or the touch pad. In addition, when the user moves his finger on the display unit 151 or the touch pad, the path along which the user's finger moves may be visually displayed on the display unit 151. This would be useful in editing an image displayed on the display unit 151. One function of the terminal may be executed in case in which the display unit 151 (touch screen) and the touch pad are touched together within a certain time range. The both touches may be clamping the terminal body with the user's thumb and index finger. This one function may be, for example, activation or deactivation of the display unit 151 or the touch pad.

Also, the display unit 151 may be configured as a stereoscopic display unit 152 displaying a stereoscopic image. Here, the stereoscopic image may be a three-dimensional (3D) stereoscopic image. The 3D stereoscopic image may allow a viewer (or a user) to feel a gradual depth and reality of an object on a monitor or a screen. The 3D stereoscopic image is implemented by using binocular disparity. Binocular disparity refers to disparity made by the positions of two eyes spaced apart by about 65 millimeters. When two eyes view different 2D images, the images are transferred to the brain through the retina and combined in the brain, and as a result, the viewer can have the perception of the sense of depth and reality from the stereoscopic image.

The stereoscopic display unit 152 may employ a stereoscopic display scheme (a glass scheme), an auto-stereoscopic scheme (glassless scheme), a projection scheme (holographic scheme), or the like. The stereoscopic scheme, which is commonly used for television receivers at home, or the like, includes Wheatstone stereoscopic scheme, and the like. The auto-stereoscopic scheme includes, for example, a parallax barrier scheme, a lenticular scheme, an integral imaging scheme, a switchable lens scheme, and the like. The projection scheme includes a reflective holographic scheme, a transmissive holographic scheme, and the like.

The 3D stereoscopic image may be comprised of a left image (a left eye image) and a right image (a right eye image). According to how left and right images are combined into the 3D stereoscopic image, the 3D stereoscopic imaging scheme is divided into a top-down scheme in which left and right images are disposed up and down within a frame, an L-to-R (left-to-right, side by side) scheme in which the left and right images are disposed left and right within a frame, a checker board scheme in which fragments of the left and right images are disposed in a tile form, an interlaced scheme in which the left and right images are alternately disposed by columns and rows, and a time sequential (or frame by frame) scheme in which the left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The left image thumbnail and the right image thumbnail may be displayed with a horizontal distance difference there between by a depth sense corresponding to the disparity between the left image and the right image on the screen, thus providing a stereoscopic space sense.

The left image and the right image required for implementing the 3D stereoscopic image may be displayed on the stereoscopic display unit 152 by a stereoscopic processing unit (not shown). The stereoscopic processing unit may receive the 3D image and extract the left image and the right image, or may receive a 2D image and change it into the left image and the right image. When a touch sensor is overlaid on the stereoscopic display unit 152 in a layered manner (referred to as a 'stereoscopic touch screen', hereinafter), or when the stereoscopic display unit 152 and a 3D sensor sensing a touch operation are combined, the stereoscopic display unit 152 may also be used as a 3D input device. As examples of the 3D sensor, the sensing unit 140 may include the proximity sensor 141, a stereoscopic touch sensing unit 142, an ultrasonic sensing unit 143, and a camera sensing unit 144.

The proximity sensor 141 detects a distance between a sensing object (e.g., the user's finger or a stylus) applying a touch by using the force of electromagnetism or infrared rays, without a mechanical contact, and a detect surface. By using the distance, the terminal can recognize which portion of a stereoscopic image has been touched. In particular, when the touch screen is an electrostatic touch screen, the degree of proximity of the sensing object is detected based on a change in an electric field according to proximity of the sensing object, and a touch to the 3D image is recognized by using the degree of proximity.

The stereoscopic touch sensing unit 142 is configured to sense the strength or duration of a touch applied to the touch screen. For example, the stereoscopic sensing unit 142 senses a pressure used to apply the touch, and when the pressing force is strong, the stereoscopic touch sensing unit 142 recognizes the touch for an object farther from the touch screen toward the interior of the terminal. The ultrasonic sensing unit 143 is configured to recognize position information of the sensing object by using an ultrasonic wave. The ultrasonic sensing unit 143 may include, for example, an optical sensor 121 and a plurality of ultrasonic sensors. The optical sensor is configured to sense light. For example, light may be ultraviolet rays, and the optical sensor may be an infrared port (Infrared data association (IRDA)). The ultrasonic sensors may be configured to sense the ultrasonic wave. The plurality of ultrasonic sensors are disposed to be spaced apart, and accordingly, the plurality of ultrasonic sensors have a time difference in sensing the ultrasonic wave generated from the same position or adjacent positions.

An ultrasonic wave and light are generated from a wave generation source. The wave generation source is provided in the sensing object, e.g., a stylus, or the like. Since light is even faster than ultrasonic wave, time for light to arrive at the optical sensor is even shorter than time for the ultrasonic wave to arrive at the ultrasonic sensor. Thus, the position of the wave generation source can be calculated by using the time difference from the time for the ultrasonic wave to arrive based on light as a reference signal. There are time differences for the ultrasonic wave generated from the wave generation source to arrive at the plurality of ultrasonic wave sensors. Thus, when the stylus moves, there is a change in the difference in the arrival time. By using this, position information can be calculated according to the movement path of the stylus. However, the ultrasonic wave sensing unit according to an embodiment of the present disclosure is not limited to the scheme of transmitting an ultrasonic wave from the stylus. For example, a scheme in which the terminal generates an ultrasonic wave and the sensing target detects the reflected ultrasonic wave may also be used. The camera sensing unit 144 includes at least one of a camera, a photo sensor, and a laser sensor. For example, the camera and the laser sensor may be combined to detect a touch of the sensing object with respect to a 3D stereoscopic image. When distance information sensed by the laser sensor is added to a 2D image captured by the camera, 3D information can be obtained. In another example, a photo sensor may be laminated on the display device. The photo sensor is configured to scan a movement of the sensing object in proximity to the touch screen. In one exemplary implementation, the photo sensor may include photo diodes and transistors formed at rows and columns to scan content mounted on the photo sensor by using an electrical signal changing according to the quantity of light applied to the photo diodes (or the intensity of light there around). Namely, the photo sensor calculates the coordinates of the sensing object according to variation of light to thus obtain position information of the sensing object. Hereinafter, a mechanism for enhancing optical performance with respect to a stereoscopic image in the mobile terminal 100 will be described in detail. The mobile terminal in relation to the present disclosure includes a mechanism implementing a stereoscopic image without degrading resolution in the auto-stereoscopic scheme.

Figure 2B:
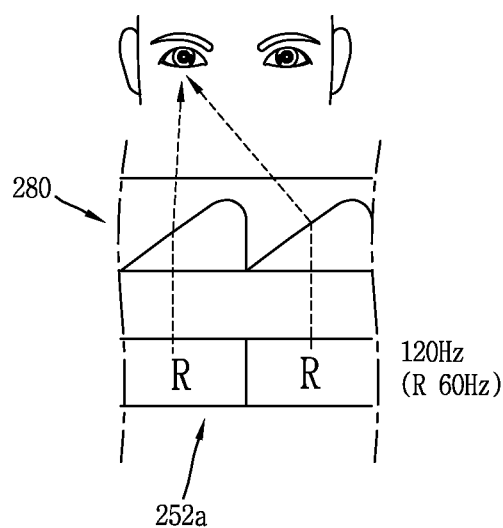

FIGS. 2A and 2B are conceptual views showing an example of an operation of the mobile terminal related to the present disclosure. With reference to the drawings, a mobile terminal 200 (See FIG. 3) is configured to repeatedly output a left image and a right image one by one from a display element (or a display 252a). In order to implement a stereoscopic image, a left image and a right image should be output toward a left eye and a right eye of the user, respectively. This function is implemented by a refractive lens unit 280.

As illustrated, the refractive lens unit 280 is disposed to overlap with a display element 252a and is light-transmissive. The refractive lens unit 280 is formed such that refractive characteristics thereof are changed. The refractive lens unit 280 are configured to have both first refractive characteristics (See FIG. 2A) that refract a left image toward the user's left eye and second refractive characteristics (See FIG. 2B) that refract a right image toward the user's right eye. The first refractive characteristics and the second refractive characteristics are periodically repeated to correspond to output periods of the left image and the right image, thereby implementing a stereoscopic image. The stereoscopic image may be configured to be protruded to an outer side of the terminal based on the window of the terminal or depressed to an inner side of the terminal.

In case of a scheme in which the display element 252a simultaneously outputs a left image and a right image in a divided manner and the refractive lens unit 280 refracts the dividedly output left image and right image toward the user's left eye and right eye, respectively, the resolution thereof will be degraded. Namely, if the display element 252a simultaneously outputs a left image and a right image in a divided manner, each at a respective output frequency of 60 Hz, the resolution thereof will be degraded due to the division of the image (e.g., if the display element is divided into two regions and the left image and the right image are output at an output frequency of 60 Hz to the two divided regions, respectively, the resolution thereof will be degraded due to the division).

However, in comparison to the related art in which the left image and the right image are output in a divided manner, in an embodiment of the present disclosure, the left image and the right image are alternately displayed at an output frequency of 2-fold or greater, e.g., at an output frequency of 120 Hz. Thus, the left image and the right image are output at the frequency of 60 Hz, respectively, without being divided, and accordingly, a degradation of the resolution thereof can be prevented.

Figure 3A:
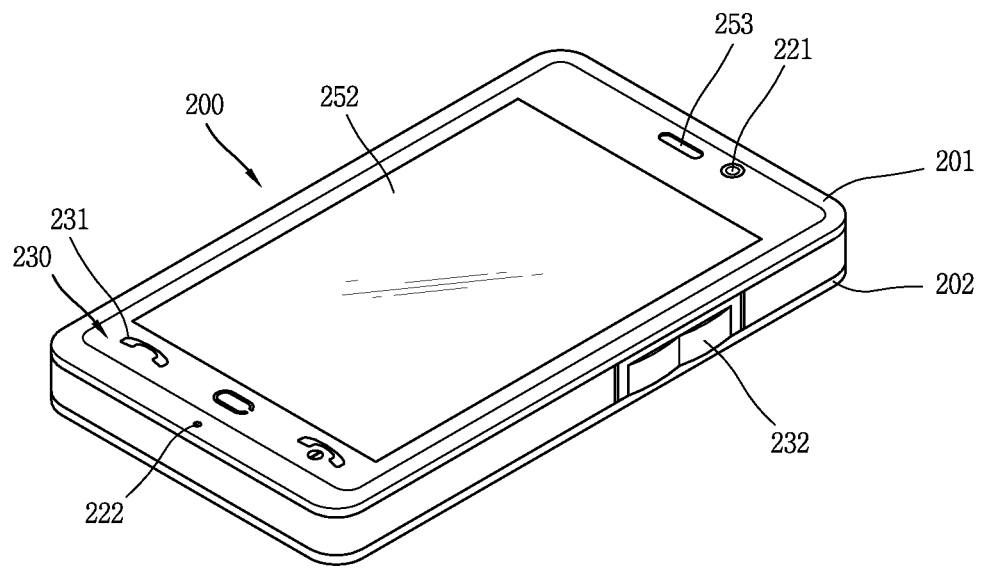
FIGS. 3A and 3B are front and rear perspective views of the mobile terminal of FIG. 2, respectively.
Figure 3B:
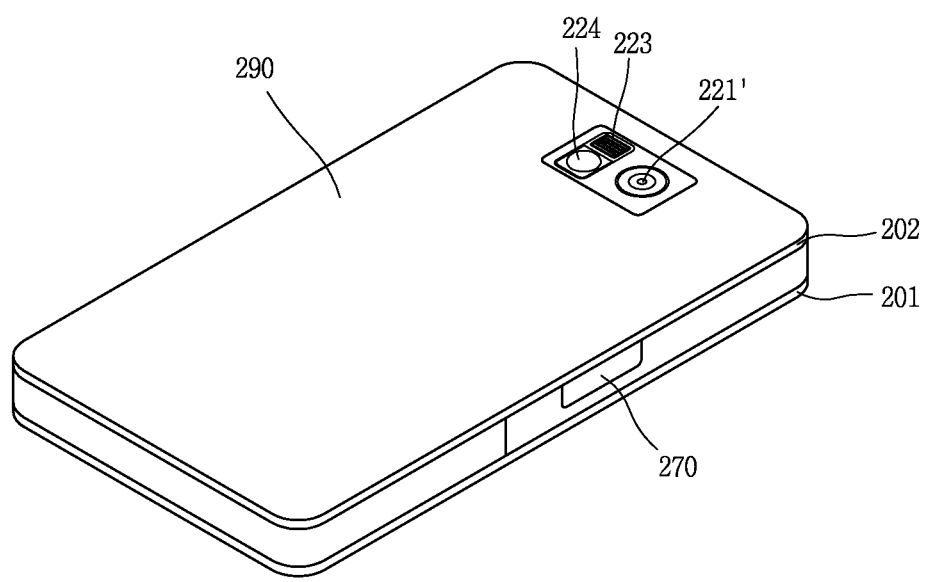

A hardware configuration of the mobile terminal that can operable as illustrated in FIG. 2 will be described with reference to FIGS. 3A, 3B, and 4. FIG. 3A is a front perspective view of the mobile terminal in relation to an embodiment of the present disclosure, and FIG. 3B is a rear perspective view of the mobile terminal illustrated in FIG. 3A. The disclosed mobile terminal 200 has a bar type terminal body. However, the present disclosure is not limited thereto and may be applicable to various structures such as a slide type mobile terminal, a folder type mobile terminal, a swing type mobile terminal, a swivel type mobile terminal, etc, in which two or more bodies are coupled to be relatively movable.

The body includes a case (or casing, housing, cover, etc.) constituting the external appearance. In this embodiment, the case may include a front case 201 and a rear case 202. Various electronic components are installed in the space between the front case 201 and the rear case 202. One or more intermediate cases may be additionally disposed between the front case 201 and the rear case 202. The cases may be formed by injection-molding a synthetic resin or may be made of a metallic material such as stainless steel (STS) or titanium (Ti), etc.

A stereoscopic display unit 252, an audio output unit 253, a camera 221, user input units 230/231, 232, a microphone 222, an interface unit 270, and the like, may be disposed on the terminal body, largely, on the front case 201. The stereoscopic display unit 252 occupies the most portions of main surface of the front case 201. The audio output unit 253 and the camera 221 are disposed at a region adjacent to one end portion among both end portions of the stereoscopic display unit 252, and the user input unit 231 and the microphone 222 are disposed at a region adjacent to the other end portion. The user input unit 232 and the interface unit 270 may be disposed on the lateral sides of the front case 201 and the rear case 202.

The user input unit 230 is manipulated to receive a command for controlling the operation of the mobile terminal 200 and may include a plurality of manipulation units 231 and 232. The manipulation units 231 and 232 may be generally referred to as a manipulating portion, and various methods and techniques may be employed for the manipulation portion so long as they can be operated by the user in a tactile manner. Content input by the first and second manipulation units 231 and 232 can be variably configured. For example, the first manipulation unit 231 may receive a command such as starting, ending, scrolling, etc., and the second manipulation unit 232 may receive a command such as controlling of the size of a sound output from the audio output unit 152, conversion into a touch recognition mode of the display unit 151, and the like.

With reference to FIG. 3B, a camera 221' may additionally be disposed on the rear surface of the terminal body, namely, on the rear case 202. The camera 221' may have an image capture direction which is substantially opposite to that of the camera 121 (See FIG. 3A), and have a different number of pixels than that of the camera 221. For example, the camera 221 may have a smaller number of pixels to capture an image of the user's face and transmit such image to another party, and the camera 221' may have a larger number of pixels to capture an image of a general object and not immediately transmit it in most cases. The cameras 221 and 221' may be installed on the terminal body such that they can be rotatable or popped up.

A flash 223 and a mirror 224 may be additionally disposed adjacent to the camera 221'. When an image of a subject is captured with the camera 221', the flash 223 illuminates the subject. The mirror 224 allows the user to see himself when he wants to capture his own image (e.g., self-image capturing) by using the camera 221'. An audio output unit may additionally be disposed on the rear surface of the terminal body. The rear audio output unit may implement stereophonic sound functions in conjunction with the front audio output unit 253 (See FIG. 3A) and may be also used to implement a speaker phone mode for call communication.

A power supply unit 290 for supplying power to the mobile terminal 200 is mounted on the terminal body. The power supply unit 290 may be installed within the terminal body or may be directly attached to or detached from the exterior of the terminal body. Besides the antenna for a call, or the like, mounted on the terminal body, a broadcast signal receiving antenna, a Bluetooth™ antenna, a satellite signal receiving antenna, an antenna for receiving data of the wireless Internet, or the like, may additionally be disposed. A mechanism implementing the driving (or the operation) of the mobile terminal illustrated in FIGS. 2A and 2B is installed in the terminal body. The mechanism will be described in detail with reference to FIG. 4.

Figure 4:
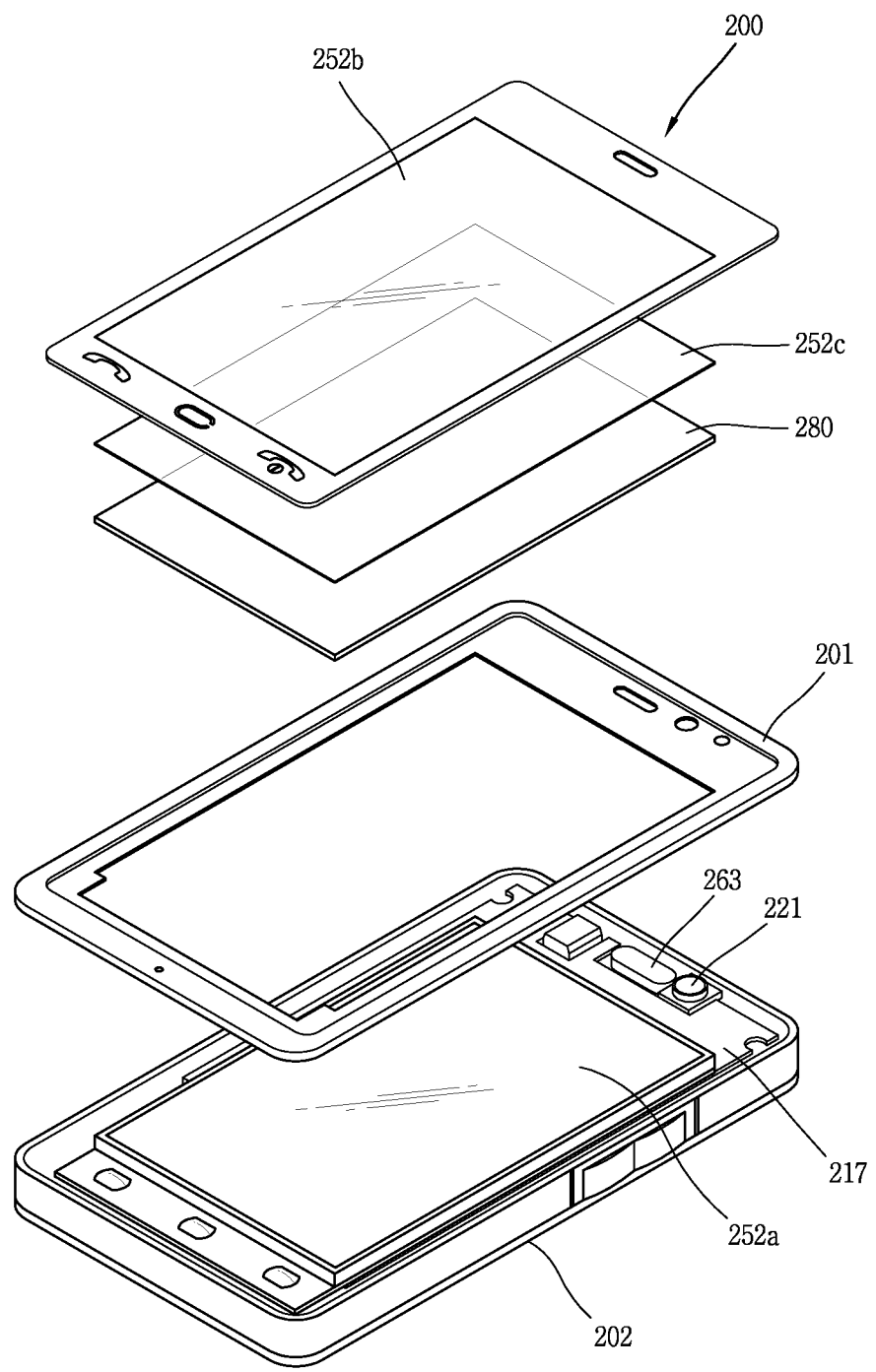
FIG. 4 is an exploded perspective view of the mobile terminal of FIG. 3A.

FIG. 4 is an exploded perspective view of the mobile terminal of FIG. 3A. With reference to FIG. 4, a window 252b is coupled to one surface of the front case 201. The window 252b is made of a material allowing light to be transmitted therethrough. For example, the window 252b may be made of a light-transmissive synthetic resin, tempered glass, or the like. Here, the window 252b may include a portion not allowing light to be transmitted therethrough. As illustrated, the portion not allowing light to be transmitted therethrough may be implemented by covering the window with a pattern film. The pattern film may be configured such that the center thereof is transparent and the edges thereof are opaque.

A display element (or a display) 252a may be mounted on a rear surface of the window 252b. A portion of the window 252b allowing light to be transmitted therethrough may have an area corresponding to the display element 252a. Thus, the user may recognize visual information output from the display element 252a from the outside. A touch sensor 252c for sensing a touch input may be mounted on the window 252b. In particular, when a stereoscopic image is formed toward the interior of the terminal based on the window 252b (e.g., when the stereoscopic image is implemented with a minus depth sense), a touch with respect to the stereoscopic image is sensed through the touch sensor 252c. The stereoscopic display unit 252 forms a stereoscopic touch screen along with the touch sensor 252c, and the stereoscopic touch screen may be an example of the user input unit 230.

A circuit board 217 may be mounted on the rear case 202. The circuit board 217 may be configured as an example of the controller 180 (See FIG. 10 for operating various functions of the mobile terminal). As illustrated, an audio output element 263, a camera 221, and the like, may be mounted on the circuit board 217. The audio output element 263 may be, for example, a speaker, a receiver, or the like, and the camera 221 may be provided for a self-capturing or a video call. Here, the camera 221 may be omitted.

As illustrated, the refractive lens unit 280 is disposed to overlap with the display 252a within the terminal. The refractive lens unit 280 may be formed to have changeable refractive characteristics. In one exemplary implementation, the refractive lens unit 280 is disposed between the display element 252a and the window 252b, and a processor of the circuit board 217 controls the refractive characteristics of the refractive lens unit 280 such that a refraction direction of transmitted light is periodically changed to make the left and right images face different directions.

In one exemplary implementation, the processor of the circuit board 217 repeatedly displays (periodically displays) left and right images on the display element 252a to implement a stereoscopic image, and controls the refractive lens unit 280 to repeatedly refract the images toward the left eye and the right eye according to the repetition period of the images. In this manner, the window 252b, the display element 252a, and the refractive lens unit 280 constitute the stereoscopic display unit 252, and the stereoscopic display unit 252 displays a stereoscopic image having excellent optical performance.

Figure 5:
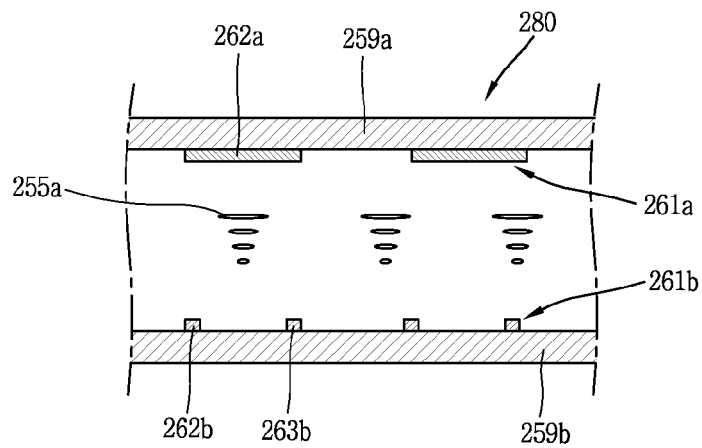
FIG. 5 is a partial sectional view showing a structure of a refractive lens unit of FIG. 4.
Figure 6A:
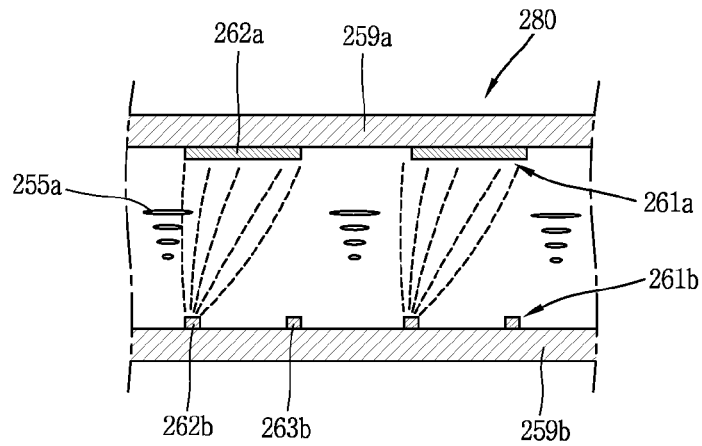
FIGS. 6A and 6B are views showing operations of the refractive lens unit of FIG. 5.
Figure 6B:
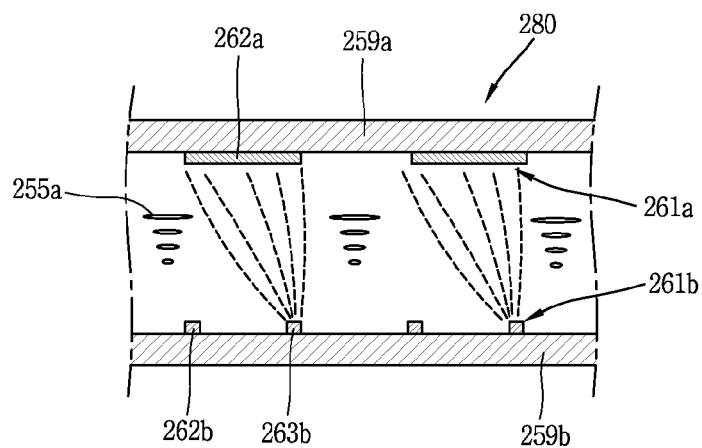

Hereinafter, an example of the refractive lens unit 280 having changeable refractive characteristics will be described in detail with reference to FIGS. 5 to 6B. FIG. 5 is a partial sectional view showing a structure of the refractive lens unit 280 of FIG. 4. FIGS. 6A and 6B are views showing operations of the refractive lens unit 280 of FIG. 5. With reference to these drawings, the refractive lens unit 280 is formed such that a state of liquid crystal accommodated therein is changed according to a change in a voltage distribution. For example, the refractive lens unit 280 may be configured as a liquid crystal panel.

The liquid crystal panel includes an upper substrate 259a and a lower substrate 259b, and the lower substrate 259b is separated from the upper substrate 259a to form space for accommodating liquid crystal 255a. The upper substrate 259a and the lower substrate 259b are made of a light-transmissive material (e.g., glass, plastic, etc.). The upper substrate 259a may be a color filter substrate (or color filter glass), and the lower substrate 259b may be a thin film transistor (TFT) array substrate (or TFT array glass). Electrodes 261a and 261b for applying a voltage to the liquid crystal 255a are disposed on the upper substrate 259a and the lower substrate 259b, and TFTs disposed on the lower substrate 259b are electrically connected to the electrodes 261a and 261b to adjust the voltage.

The liquid crystal panel is driven by a processor of the circuit board, but the present disclosure is not limited thereto. For example, a driver integrated circuit may be mounted on the lower substrate 252b and the driver integrated circuit may control power supply with respect to electrode films. The electrodes 261a and 261b are configured to be light-transmissive (e.g., an ITO electrode), and include upper electrode(s) 261a and lower electrode(s) 261b. The upper electrode(s) 261a is formed on the upper substrate 259a, and the lower electrode(s) 261b is disposed on the lower substrate 259b. The upper electrode(s) 261a and the lower electrode(s) 261b form a voltage, which is periodically changed, there between to allow the state of the liquid crystal to be periodically changed. In one exemplary implementation, the upper electrode(s) 261a and the lower electrode(s) 261b include unit electrodes 262a, 262b, 263b, and other electrodes, which are repeatedly disposed on the upper substrate 259a and the lower substrate 259b, respectively, and the processor periodically controls supply of power to the unit electrodes 262a, 262b, 263b, and other electrodes.

As illustrated, among the upper electrode(s) 261a and the lower electrode(s) 261b, the unit electrode 262a may be of a different size than the unit electrode 262b or the unit electrode 263b. The unit electrode 262a of the upper electrode(s) 261a is formed to be longer than the unit electrode 262b or the unit electrode 263b of the lower electrode(s) 261b. However, the present disclosure is not limited thereto, and the structures of the upper electrode 261a and the lower electrode 261b may be different in other embodiments. The first and second unit electrodes 262b and 263b may be disposed within a single unit cell. In this case, the first and second unit electrodes 262b and 263b are disposed to face the unit electrode 262a of the upper electrode 261a. In one exemplary implementation, the first and second unit electrodes 262b and 263b may be disposed to directly face each end of the unit electrode 262a of the upper electrode 261a, respectively. The circuit board 217 controls refractive characteristics of the liquid crystal panel by changing the state of the liquid crystal so that left and right images can face the user's left and right eyes, respectively.

With reference to FIGS. 6A and 6B, the circuit board 217 (See FIG. 4) controls the power supply to the first and second unit electrodes 262b and 263b. For example, when the left image is displayed on the display element (252a in FIG. 4, an electric field is applied between the unit electrode 262a of the upper electrode 261a and the first unit electrode 262b (See FIG. 6A). The state of the liquid crystal is changed to correspond to the electric field to reach a first state (e.g., the state illustrated in FIG. 2A) as mentioned above. Also, when the right image is displayed on the display element 252a, an electric field is applied between the unit electrode 262a of the upper electrode 261a and the second unit electrode 263b (See FIG. 6B), and the state of the liquid crystal is changed to correspond to the electric field to reach a second state (e.g., the state illustrated in FIG. 2B) as mentioned above. The electric fields formed in the first and second states form a symmetrical structure, and accordingly, the state of the liquid crystal that refracts light to the left and right sides can be changed. In this manner, the display element is configured to periodically display the left and right images, and since the state of the liquid crystal accommodated in the refractive lens unit is periodically changed to match the display period of the left and right images, thus implementing a stereoscopic image.

Figure 7A:
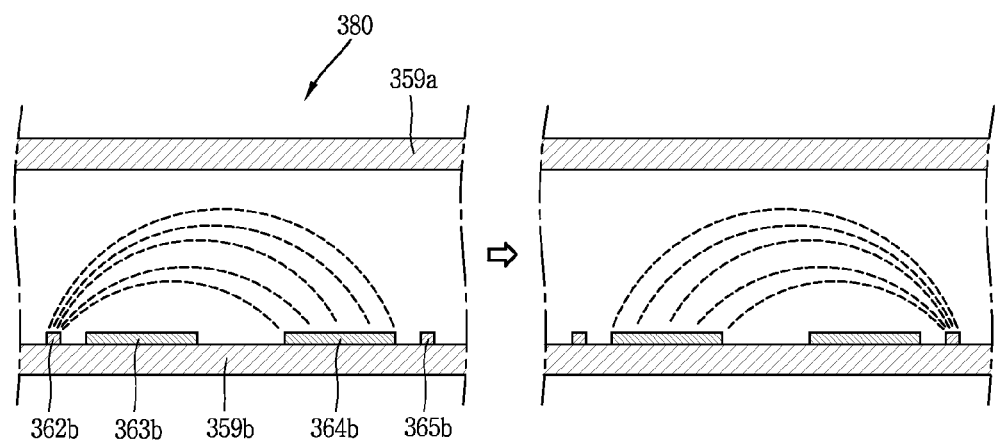
FIGS. 7A and 7B are conceptual views showing variants of the refractive lens unit of FIG. 5.
Figure 7B:
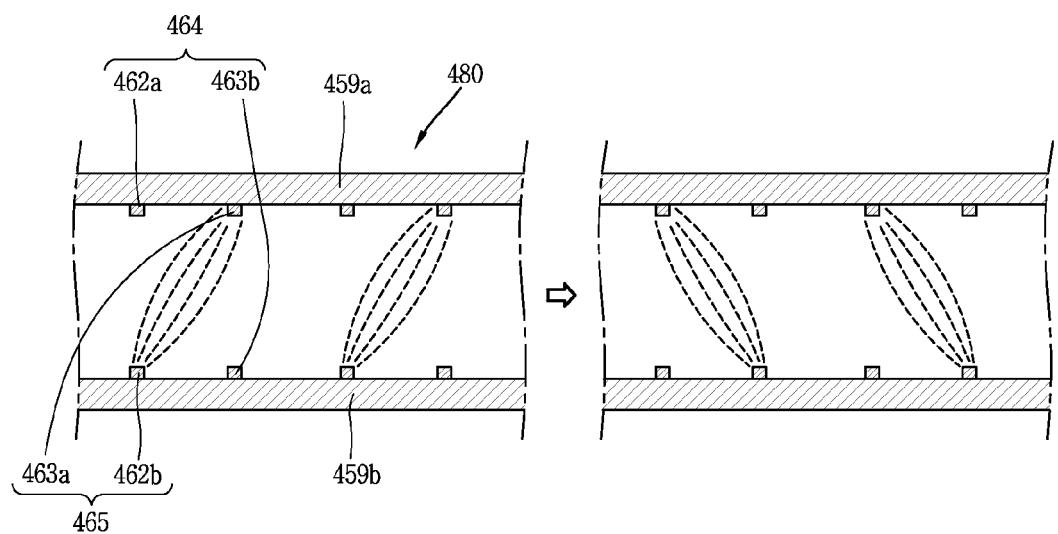

Hereinafter, a variant and other embodiments of the present disclosure will be described, in describing the variant and other embodiments of the present disclosure, like or similar reference numerals are used for the like or similar elements as those of the former embodiment, and a description thereof will be omitted. FIGS. 7A and 7B are conceptual views showing variants of the refractive lens unit of FIG. 5, showing a different structure of the refractive lens unit in which the state of the liquid crystal is periodically changed. With reference to FIG. 7A, the refractive lens unit 380 includes first and second unit electrodes 362b and 363b of different lengths arranged on a light-transmissive substrate and third and fourth unit electrodes 364b and 365b disposed symmetrical to the first and second unit electrodes 362b and 363b with respect to a line dividing the first and second unit electrodes 362b and 363b and the third and fourth unit electrodes 364b and 365b.

In one exemplary implementation, liquid crystal is disposed between an upper substrate 359a and a lower substrate 359b, and unit electrodes 362b, 363b, 364b and 365b are arranged on the lower substrate 359b. The first and second unit electrodes 362b and 363b and the third and fourth unit electrodes 364b and 365b are disposed in sequence and symmetrical to each other with respect to a line dividing the first and second unit electrodes 362b and 363b and the third and fourth unit electrodes 364b and 365b. As illustrated, a first electric field is formed between the first unit electrode 362b and the third unit electrode 364b, and a second electric field is formed between the second unit electrode 363b and the fourth unit electrode 365b. The distribution of the first electric field is different from the distribution of the second electric field. Thus, a refractive state of the refractive lens unit 380 can be controlled (e.g., periodically) by alternately forming the first electric field and the second electric field.

With reference to FIG. 7B, a plurality of electrodes 462a, 463a, 462b, and 463b are arranged on a upper substrate 459a and a lower substrate 459b. The plurality of electrodes 462a, 463a, 462b, and 463b are grouped into first and second groups 464 and 465. The first and second groups 464 and 465 are alternately controlled to form a voltage which is periodically changed. In one exemplary implementation, the electrodes 462a and 463a of the upper substrate 459a are disposed to face the electrodes 462b and 463b of the lower substrate 459b respectively, and the electrodes facing each other diagonally are grouped into the first and second groups. As illustrated, the electric fields of the first and second groups are symmetrical, an accordingly, a refractive state of the refractive lens unit 480 can be periodically controlled.

Figure 8:
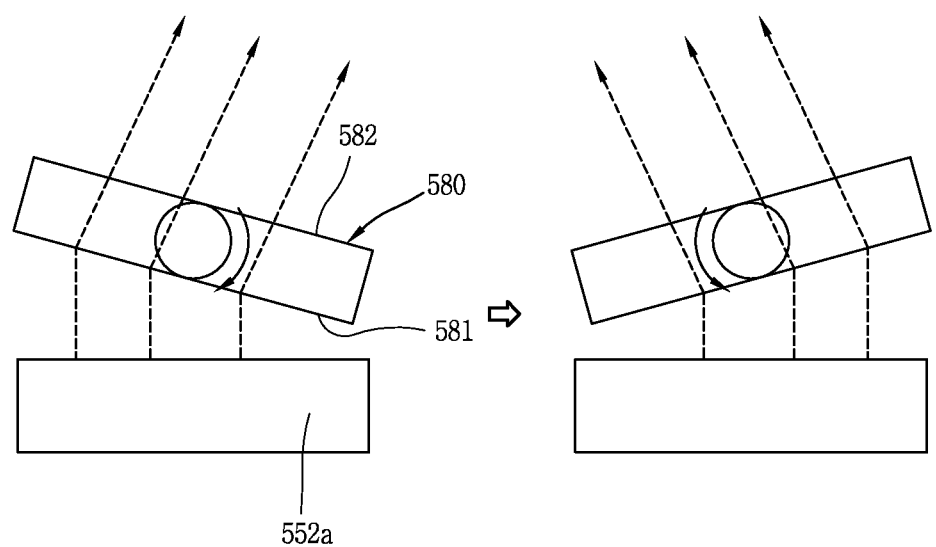
FIG. 8 is a conceptual view showing another embodiment of the refractive lens unit.

In the above description, the state of liquid crystal is controlled by varying the electric field. Hereinafter, another method for controlling the refraction direction of left and right images will be described. FIG. 8 is a conceptual views showing another embodiment of a refractive lens unit 580. As illustrated, the refractive lens unit 580 is configured to tilt, and the angle between the refractive lens unit 580 and a display element 552a may be periodically controlled by tilting the refractive lens unit 580. The refractive lens unit 580 may be a permeable lens having an incident surface 581 and an output surface 582. The incident surface 581 and the output surface 582 are sloped to the display element 552a according to the tilting of the refractive lens unit 580.

In one exemplary implementation, the refractive lens unit 580 tilts such that when one end thereof becomes close to the display element 552a, the other end thereof moves further away from the display element 552a, by which the refractive lens unit 580 alternately refracts images to the left side and to the right side. The incident surface 581 and the output surface 582 of the refractive lens unit 580 may be formed to be parallel. As illustrated, since the incident surface 581 and the output surface 582 are all planes (or have flat surfaces), incident light is refracted by the same angle, and accordingly, an image may be deflected to the left side and right side. The structural characteristics of enhancing optical performance with respect to a stereoscopic image have been described, and such structural characteristics may provide a novel user interface.

Figure 9A:
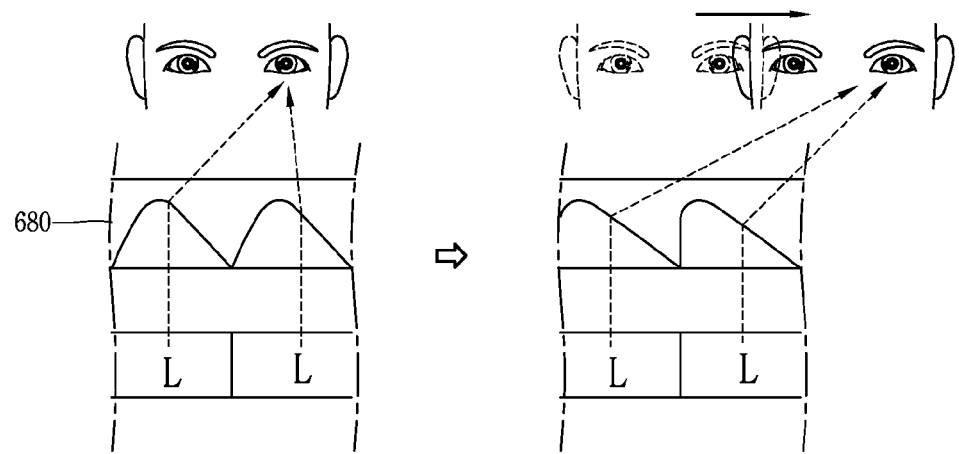
FIGS. 9A to 9C are conceptual views showing another embodiment regarding a method for controlling a stereoscopic image in the present disclosure.
Figure 9B:
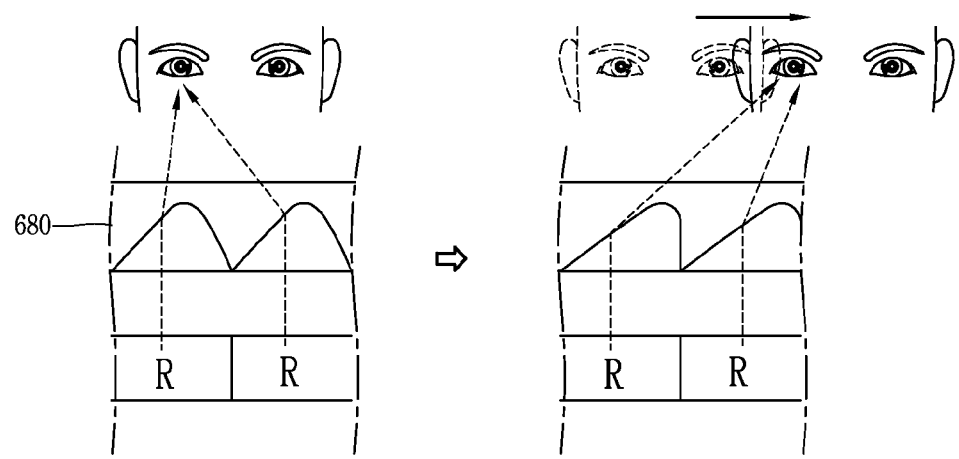

FIGS. 9A and 9B are conceptual views showing another embodiment regarding a method for controlling a stereoscopic image in the present disclosure. According to the present embodiment, the terminal includes a sensing unit (not shown) for sensing a reference part of the user and a relative location of the stereoscopic display unit. The reference part of the user may be the user's face, nose, eyes, fingers, head, and the like. The camera (e.g., the camera 221 in FIG. 3A) may be provided as an example of the sensing unit for sensing a user's location. In this case, a degree at which the user is deflected from the terminal main body to the left or right may be calculated from the image captured by the camera. However, the present disclosure is not limited thereto and a proximity sensor, a stereoscopic touch sensing unit, an ultrasonic wave sensing unit, or the like, may be used in place of the camera.

The controller controls refractive characteristics of the refractive lens unit 680 by using the relative location. With reference to these drawings, the sensing unit detects a degree at which a user's reference part is deflected to the left or right based on the main body, and the refractive characteristics are controlled in order to adjust the deflection degree. For example, when the user moves to the left, as shown in FIG. 9A the refractive lens unit 680 is controlled such that a refraction angle with respect to a left image is increased. Further, as shown in FIG. 9B, although a refraction angle with respect to a right image is a light refraction toward the left side, rather than toward the right side, the state of liquid crystal of the refractive lens unit 680 is controlled to correspond to the user's right eye.

Figure 9C:
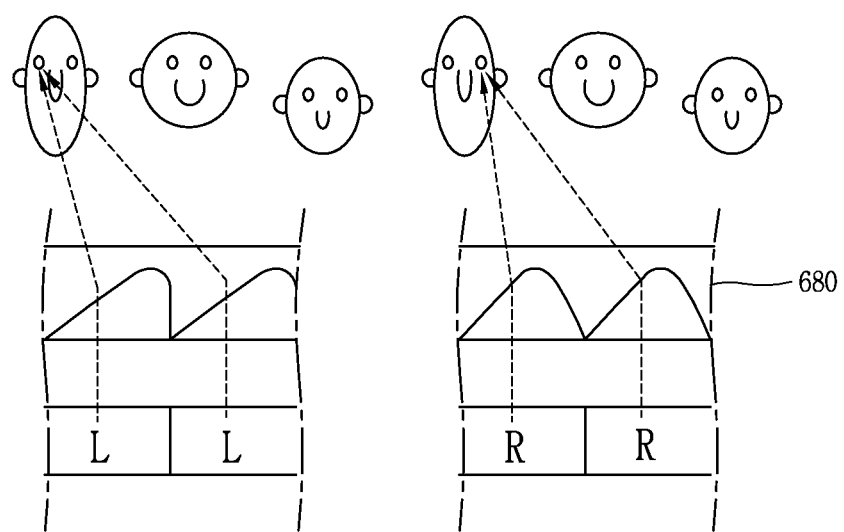

FIG. 9C is a view showing a method for controlling a stereoscopic image according to another embodiment of the present disclosure. With reference to FIG. 9C, the sensing unit senses locations of a plurality of users, and outputs a stereoscopic image focused on the location of a main user among the plurality of users. In one exemplary implementation, refractive characteristics of the refractive lens unit 680 are controlled to periodically output an image toward the left eye and the right eye based on the location of the main user. For example, when an image of the plurality of users is captured by using a camera, the captured image is converted into image data, a pre-set main user's face is discriminated by using the image data, and the location of the main user is detected by using the discriminated face. The detection of the main user's face may be implemented by a face recognition algorithm. In another example, the sensing unit is formed to sense the locations of the plurality of users, and the location of the user used as a reference of detection by the detection unit may be a location of a user who is first sensed from among the plurality of users. Namely, the first sensed user is a main user. In this case, since data processing is not required to detect the main user, the control speed of the terminal can be increased.

Figure 10A:
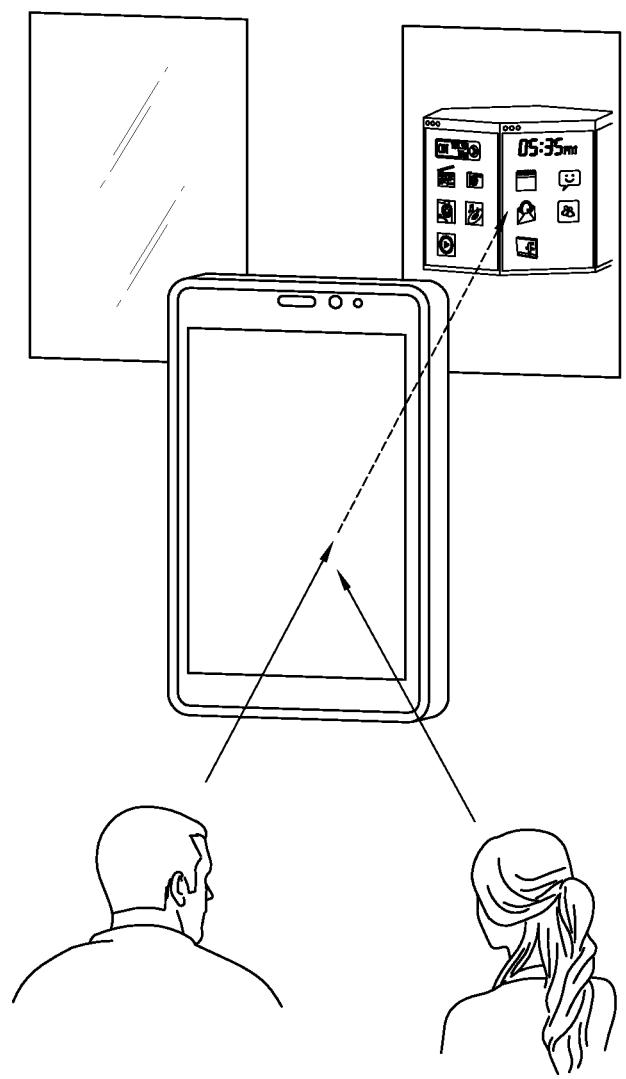
FIGS. 10A and 10B are conceptual views showing a user interface related to another embodiment of the present disclosure.
Figure 10B:
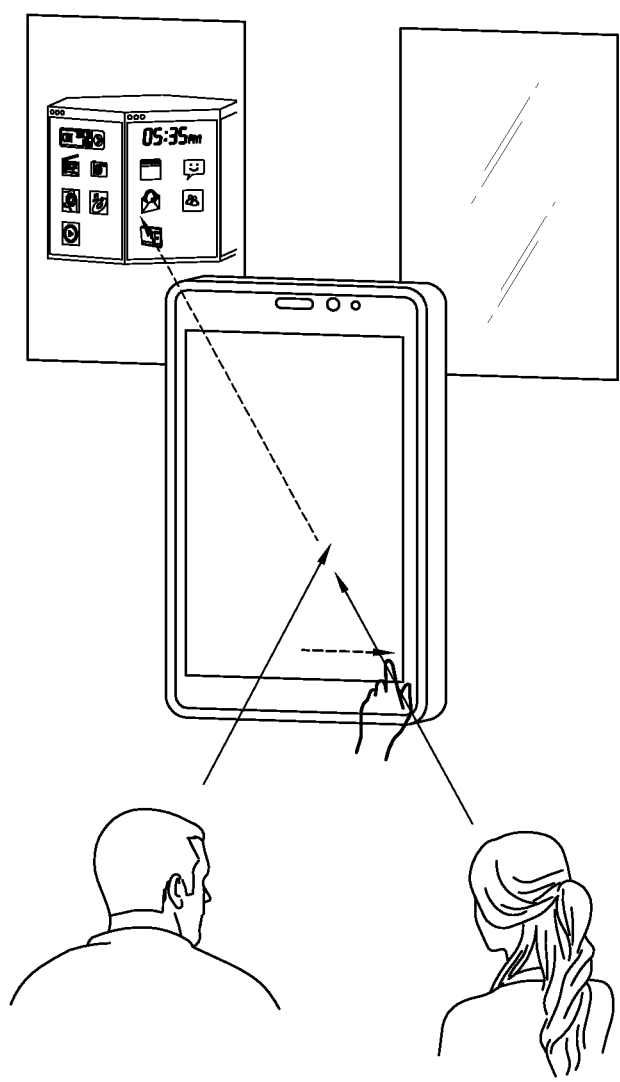

FIGS. 10A and 10B are conceptual views showing a user interface related to another embodiment of the present disclosure. As illustrated in FIGS. 10A and 10B, the stereoscopic display unit is configured to sense a touch input, and the directions in which left and right images face are changed according to the touch input. In this case, the controller controls refractive characteristics of the refractive lens unit such that the directions in which the left and right images face are adjusted by using a direction of a drag input with respect to the stereoscopic display unit.

In one exemplary implementation, when there is a drag input toward the right in a state (e.g., the state of FIG. 10A) in which only the left user among the plurality of users can view the stereoscopic image, the current state is changed to a state (e.g., the state of FIG. 10B) in which only the right user can view the stereoscopic image. This can be implemented by controlling the refractive characteristics of the refractive lens unit according to the drag input as described above.

Figure 11:
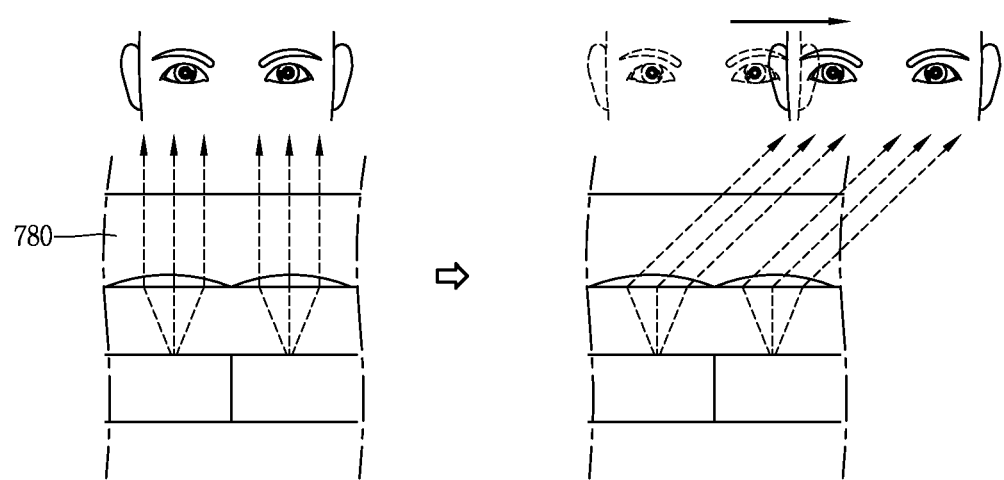
FIG. 11 is a conceptual view showing a user interface related to another embodiment of the present disclosure.

FIG. 11 is a conceptual view showing a user interface related to another embodiment of the present disclosure. According to the present embodiment, the stereoscopic display unit is configured to selectively display a 2D image and a stereoscopic image. In case of the stereoscopic image, the features of the embodiments as described above can be applied thereto, and in case of the 2D image, a single image, without discriminating left and right images, is output to the display element. Hereinafter, a method for controlling a 2D image in relation to the present disclosure will be described. With reference to FIG. 11, the controller controls refractive characteristics of a refractive lens unit 780 such that a viewing angle of a 2D image can be adjusted. For example, the stereoscopic display unit is disposed on a front surface of the terminal main body, and the controller controls the refractive characteristics of the refractive lens unit 780 such that the 2D image is collected in a direction perpendicular to the front surface of the terminal main body, rather than being outputted in a direction in which it spreads based on the front surface of the main body.

Since the refractive characteristics of the refractive lens unit 780 can be adjusted as desired, the viewing angle of the image output from the terminal can be adjusted and a privacy protection function can be performed. For example, when the user views at the front, the angle of light is adjusted by adjusting an electric field to make light entirely proceed to the front. Accordingly, the screen cannot be viewed at a different angle, thus implementing a privacy protection function. In addition, by using the sensing unit sensing the user's location, the controller may control the refractive characteristics of the refractive lens unit 780 such that the direction of outputting the 2D image is changed according to a movement of the user. Namely, when the user moves, the refractive index is changed to turn the direction, and accordingly, the viewing angle can be adjusted and privacy of the main user can be protected. The adjustment of the viewing angle can be made in a similar manner to that of the viewing angle of the stereoscopic image as mentioned above.

Also, the function of adjusting the viewing angle may be performed under pre-set conditions. In this case, the pre-set conditions may include at least one of a pre-set time range and position information of the main body. For example, when the pre-set time is nighttime, the usage of the terminal by a child at night is limited. Or, when the pre-set time is daytime, a use of a user's terminal by someone else can be limited during working hours in the office (e.g., only the user can view the image of the screen of the terminal). Also, the location information of the main body may be obtained by using a GPS, or the like. When home is set as location information of the main body, the viewing angle is not adjusted at home to share an image together with family members, while in other areas, a function (e.g., a blocking function) of allowing only the main user to view an image may be implemented.

The mobile terminal according to at least one embodiment disclosed in the present disclosure implements the stereoscopic display unit which divides left and right images temporally (or sequentially) by periodically changing the refractive characteristics of the refractive lens unit, and outputting the divided left and right images to the left eye and right eye. Accordingly, optical performance of the stereoscopic display unit can be improved in the auto-stereoscopic scheme without degrading resolution. Also, since a user's location is sensed and the refractive characteristics of the refractive lens unit are controlled accordingly, thus implementing a user-tailored stereoscopic image (e.g., the stereoscopic image is provided only to the user) in the mobile terminal. Namely, a novel user interface allowing only a main user (in case of the presence of a plurality of users) to view a stereoscopic image is provided. In addition, since the refractive characteristics of the refractive lens unit are controlled in the 2D image, the viewing angle of an output 2D image can be adjusted.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
   a stereoscopic display unit configured to output a stereoscopic image, the stereoscopic display unit comprising:
   a display element configured to periodically display left and right images;
   a refractive lens unit disposed to overlap with the display element and configured to change refractive characteristics thereof; and
   a controller configured to control the refractive characteristics of the refractive lens unit such that a refraction direction of transmitted light is periodically changed to make the left and right images face in different directions; and
   a sensing unit mounted on a main body of the terminal and sensing a reference part of the user and a relative position of the stereoscopic display unit,
   wherein the controller is configured to control the refractive characteristics of the refractive lens unit by using the relative position, and
   wherein the controller is configured to control the refractive lens unit to tilt periodically such that when one end of the refractive lens unit becomes closer to the display element, an other end of the refractive lens unit moves further away from the display element and when the one end of the refractive lens unit moves further away from the display element, the other end of the refractive lens unit becomes closer to the display element to alternately refract the left and right images to the left side and to the right side.

2. The mobile terminal of claim 1, wherein the refractive lens unit further comprises:
   an upper electrode formed on the upper substrate; and
   a lower electrode disposed on the lower substrate and configured to form with the upper electrode a voltage which is periodically changed so that a state of the liquid crystal can be periodically varied.

3. The mobile terminal of claim 2, wherein the upper electrode and the lower electrode comprise unit electrodes which are repeatedly disposed, and the controller periodically controls power supply to the unit electrodes.

4. The mobile terminal of claim 3, wherein any one of the unit electrodes of the upper electrode and the lower electrode has a size different from another one of the unit electrodes.

5. The mobile terminal of claim 3, wherein any one of the upper electrode and the lower electrode includes first and second electrodes adjacently disposed to each other, and the controller controls a power supply to the first and second electrodes.

6. The mobile terminal of claim 1, wherein the display element is configured to periodically display the left image and the right image, and the refractive lens unit is a liquid crystal panel having liquid crystal accommodated therein, and a state of the liquid crystal is periodically changed to match a display period of the left image and the right image.

7. The mobile terminal of claim 6, wherein the controller is formed to control refractive characteristics of the liquid crystal panel according to the change in the state of the liquid crystal such that the left image and the right image face the user's left eye and right eye, respectively.

8. The mobile terminal of claim 1, wherein the refractive lens unit includes an incident surface and an output surface which are formed to be parallel, and the incident surface and the output surface are sloped with respect to the display element by the tilt.

9. The mobile terminal of claim 1, wherein the sensing unit senses a degree at which the reference part of the user is deflected to left or right based on the main body of the terminal, and the refractive characteristics are controlled to adjust a deflection degree.

10. The mobile terminal of claim 1, wherein the stereoscopic display unit is configured to sense a touch input, and directions in which the left and right images face are changed according to the touch input.

11. The mobile terminal of claim 10, wherein the controller controls the refractive characteristics such that the directions in which the left image and the right image face are adjusted by using a direction of a drag input with respect to the stereoscopic display unit.

12. The mobile terminal of claim 1, wherein the stereoscopic display unit is configured to selectively display a 2D image and the stereoscopic image, and the controller controls the refractive characteristics of the refractive lens unit to adjust a viewing angle of the 2D image.

13. The mobile terminal of claim 12, wherein the stereoscopic display unit is disposed on a front surface of a main body of the terminal, and the controller controls the refractive characteristics of the refractive lens unit such that the 2D image is collected in a direction perpendicular to a front surface of the main body, rather than being outputted in a direction in which it spreads based on the front surface of the main body.

14. The mobile terminal of claim 12, further comprising:
    a sensing unit mounted on a main body of the terminal and sensing a user's location,
    wherein the controller controls the refractive characteristics of the refractive lens unit such that a direction in which the 2D image is output is changed according to a movement of the user.

15. The mobile terminal of claim 1, wherein the refractive lens unit comprises:
    an upper substrate configured to be light-transmissive;
    a lower substrate spaced apart from the upper substrate to form a space in which liquid crystal is accommodated, and configured to be light-transmissive; and
    at least four unit electrodes formed on one of the upper substrate and the lower substrate, wherein the at least four unit electrodes include first to fourth unit electrodes substantially disposed and spaced apart from each other,
    wherein the controller is configured to form a first electric field between a first unit electrode and a third unit electrode among the first to fourth unit electrodes when the left image is displayed on the display element, and to form a second electric field between a second unit electrode and a fourth unit electrode among the first to fourth unit electrodes when the right image is displayed on the display element.

16. A mobile terminal comprising:
    a main body; and
    a stereoscopic display unit provided on the main body and outputting a stereoscopic image, the stereoscopic display unit comprising:
    a display element configured to periodically display left and right images;

a refractive lens unit disposed to overlap with the display element and to periodically change a refraction direction of transmitted light;

a controller configured to match a transition period of the refraction direction of transmitted light with a display period of the left and right images such that the left and right images face in mutually different directions; and a sensing unit mounted on a main body of the terminal and sensing a reference part of the user and a relative position of the stereoscopic display unit, wherein the controller is configured to the refractive characteristics of the refractive lens unit by using the relative position, and wherein the controller is configured to control the refractive lens unit to tilt periodically such that when one end of the refractive lens unit becomes closer to the display element, an other end of the refractive lens unit moves further away from the display element and when the one end of the refractive lens unit moves further away from the display element, the other end of the refractive lens unit becomes closer to the display element to alternately refract the left and right images to the left side and to the right side.

17. The mobile terminal of claim 16, wherein the refractive lens unit is a liquid crystal panel accommodating liquid crystal therein, and a voltage distribution of the liquid crystal panel is changed to allow the liquid crystal accommodated in the liquid crystal panel have a plurality of characteristics.

18. The mobile terminal of claim 16, wherein the refractive lens unit comprises:

an upper substrate configured to be light-transmissive;

a lower substrate spaced apart from the upper substrate to form a space in which liquid crystal is accommodated, and configured to be light-transmissive; and at least four unit electrodes formed on one of the upper substrate and the lower substrate, wherein the at least four unit electrodes include first to fourth unit electrodes substantially disposed and spaced apart from each other, and wherein the controller is configured to form a first electric field between a first unit electrode and a third unit electrode among the first to fourth unit electrodes when the left image is displayed on the display element, and to form a second electric field between a second unit electrode and a fourth unit electrode among the first to fourth unit electrodes when the right image is displayed on the display element.

* * * * *